3,773,842
PROCESS FOR THE PREPARATION OF 1,2,6-HEXANETRIOL

Jean-Pierre Schirmann, Buffalo, N.Y., and Francis Weiss, Pierre-Benite, France, assignors to Ugine Kuhlmann, Paris, France
No Drawing. Filed Jan. 27, 1969, Ser. No. 804,343
Claims priority, application France, Jan. 25, 1968, 137,422, Patent 1,559,112
Int. Cl. C07c 31/18
U.S. Cl. 260—635 A                7 Claims

ABSTRACT OF THE DISCLOSURE 1,2,6-hexanetriol is prepared from the dimer of acrolein by dissolving the acrolein dimer in excess alcohol causing addition of the alcohol to the double bond of the acrolein dimer and then simultaneously hydrolizing and hydrogenating the acrolein dimer-alcohol addition product.

1,2,6-hexanetriol is a well-known compound of considerable utility as an intermediate in the preparation of alkyd and polyester resins. It is also used as a softening agent, a moistening agent and as a solvent.

BACKGROUND OF INVENTION

Several methods have been proposed for preparing 1,2,6-hexanetriol from the dimer of acrolein. Thus, in British Pat. No. 606,564 it was recommended that the dimer be reduced to 2-methylol tetrahydropyran, the latter be treated with boiling acetic anhydride to transform it into 1,2,6-hexanetriol triacetate and that ester be saponified to collect the triol. In the same patent another process was described, consisting of selectively hydrogenating the aldehyde group of the dimer to make 2-methylol-3,4-dihydro (2H) pyran, hydrolyzing the latter into 5,6-dihydroxy-hexanal and, finally, hydrogenating that product into hexanetriol. The usual method, which is simpler and more expeditious, consists of hydrolyzing the dimer into 2-hydroxyadipaldehyde in dilute aqueous solution and then hydrogenating that aldehyde in the aqueous solution itself (Schulz and Wagner: Angew. Chem., 62:111, 1950). Although it enables high yields to be obtained, the method presents certain disadvantages in industrial application, notably that of rapid poisoning of the hydrogenation catalyst under the effect of the relatively high aldehyde concentrations in the medium and that of obtaining a slightly colored hexanetriol, which makes the product unsuitable for certain uses, such as the preparation of polyester resins. To overcome those difficulties, it was proposed in French Pat. No. 1,335,323 that the aldehyde concentration be kept at an extremely low value by introducing the 2-hydroxyadipaldehyde solution as it is consumed, but one cannot thus avoid lengthening the duration of the reaction quite considerably.

SUMMARY OF INVENTION

The applicants have developed a simple and effective process for the preparation of 1,2,6-hexanetriol from the dimer of acrolein. This process, comprises as a first stage the dissolving the acrolein dimer in excess alcohol so as to eliminate the olefinic nonsaturation by addition of said alcohol to the double bond to form the alkoxyaldeyde I or its hemiacetal II or a mixture of both and in a second stage of carrying out the hydrolysis at the same time as a catalytic hydrogenation of the product obtained in the first stage and getting the 1,2,6-hexanetriol by splitting of the nucleus.

It is known that the standard addition of alcohols to the double bond of dihydropyrans in a medium that is preferably slightly acidulated is accompanied, in the case of the dimer of acrolein, by an acetalization of the aldehyde groups thus resulting in the corresponding 2-dialkoxymethyl-6-alkoxytetrahydropyran (III) (Hall: J. Chem. Soc., 1953, p. 1398). In the applicants' experience, this type of product can well be transformed into 1,2,6-hexanetriol by hydrolysis and catalytic hydrogenation in an aqueous medium, but, however, with considerable difficulty. On the other hand, the applicants discovered that the formation of this product was progressive, saturation of the double bond by addition of the alcohol being extremely rapid and complete and yielding alkoxyaldehyde (I) or its hemiacetal (II) or a mixture of both, those two products then evolving only slowly to (III). The following structural formula indicates the probable course of the reaction:

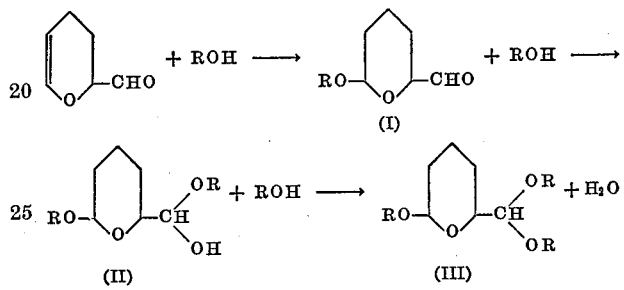

The reaction mixture obtained upon the end of saturation of the double bond then contains only products I and II or without doubt a mixture of I and II with little or no product III. The second stage as herein described is preferably carried out with this mixture although compounds I and II could be separated by known procedures and the second stage carried out with the individual compound I or II.

DESCRIPTION OF PREFERRED EMBODIMENTS

The first stage of the process then consists of dissolving the dimer in an alcohol, preferably anhydrous, but which can contain a small quantity of water, ranging up to approximately 15% by weight. Although not strictly necessary for production of the hexanetriol, it is a good idea for that alcohol to contain no function which can be hydrogenated in the next stage of the process. This alcohol is actually only an auxiliary, which is entirely recovered after the reaction, and it is not advantageous to subject it to a transformation; for example, the use of an unsaturated alcohol would lead to recovery of the corresponding saturated alcohol. Aliphatic, linear, ramified or cyclic saturated alcohols having approximately 1 to 8 carbon atoms are therefore preferred. Among them one can mention methanol, ethanol, n- and isopropanol, primary, secondary and tertiary butanols, isobutanol, 2-ethylhexanol, cyclohexanol, ethyleneglycol and hexanetriol itself, and adequate qantity of which is then simply recycled. Alcohols of the same group possessing an ether function can also be used, such as 2-methoxyethanol and 2-methylol tetrahydropyran, for example.

One preferably uses a molar excess of that alcohol, chosen between 2 and 20 mols/mol of acrolein dimer. The reaction is markedly accelerated by the presence of a small quantity of an acid, bringing the pH to between approximately 2 and 4. This acidification can be most simply carried out by addition of a very small quantity of a strong acid such as hydrochloric, sulfuric, phosphoric or p-toluenesulfonic acid at the rate, for instance, of 10 to 2000 parts per million of the mixture.

The temperature of the reaction can be varied as will be apparent to those skilled in the art but is preferably selected between about −10 and 80° C. and can vary during the reaction. The dimer can thus be dissolved in the alcohol at room temperature, the acid added and the mixture left to heat up spontaneously or else be kept at a temperature close to room temperature by cooling.

The duration of the reaction varies with the conditions adopted between a few minutes and a few hours, but it is important to stress that in most cases about a quarter of an hour of contact is sufficient. This operation therefore takes on the character of a simple blending. The simplicity and speed of this first stage are particularly advantageous and economical for application of the continuous process.

The second phase of the process consists of carrying out a catalytic hydrogenation in the presence of a standard well-known hydrogenation catalyst and in the presence of water. The presence of water is, in fact, necessary to hydrolyze the acetal groups present in the intermediate compounds, principally in forms I and II, which acetal groups include moreover the oxygen atom of the tetrahydropyran cycle. Under the preferred conditions of the process, where the medium is left appreciably at the same very low acidity as that of the first stage, this hydrolysis only liberates the aldehyde functions at a slow enough pace for hydrogenation to convert them gradually into alcohols. Due to the advantages of prior reaction of an alcohol, an effective method is therefore available for maintaining a low free aldehyde concentration in the medium, which gives the process according to the invention a marked advantage over known processes.

The quantity of water must be sufficient to assure hydrolysis of the acetal groups, but an excess is preferably used, e.g., between 4 and 30 mols of water per mol of acrolein dimer. The top limit is set only by the economic concern at restricting costs of distillation of the excess water after the reaction. Temperature can be chosen at between 40 and 160° C. and hydrogen pressure at between atmospheric pressure and approximately 50 atm.

Among the catalysts usable one can mention Raney nickel, Raney cobalt, nickel or cobalt reduced or obtained by decomposition of nickel or cobalt formate or oxalate possibly deposited on a carrier (silica, alumina, magnesia, etc.) or activated by the presence of metal promoters such as chromium, copper, molybdenum, etc. One can also use compounds such as copper chromite or precious metals like palladium, platinum, ruthenium or rhodium deposited on an inert carrier like active carbon, alumina, pumice and kieselguhr.

The quantity of catalyst to be used depends both on the nature of the catalyst and the procedure and range between 0.1 and 30% by weight related to the weight of the dimer employed. In the discontinuous process the catalyst will preferably be used in the powdered state, while in the continuous process it may be preferred to use grains or pellets on a fixed bed over which the solution to be hydrogenated will run.

The conditions of application of the process according to the invention are less strict than those of the usual process, which makes it easier to work it; in fact, the addition of an alcohol to the double bond of the dimer seems more rapid than hydrolysis into hydroxyadipaldehyde and hydrogenation of the reaction product with alcohol can take place more rapidly or under easier conditions than those necessary for the dialdehyde. The yield and the quality of the hexanetriol obtained are excellent. A practically pure colorless product is yielded by simple evaporation of the water and auxiliary alcohol after filtration of the hydrogenation catalyst and possible neutralization of the acidity present.

The following nonlimitative examples illustrate the process covered by the invention:

EXAMPLE 1

There were 250 g. of 2-formyl-3,4-dihydro (2H) pyran (2.2 mols) added to one liter of isopropanol (780 g. or 13 mols) containing 1 cc. of 10 N hydrochloric acid. The temperature rose spontaneously from 25 to 58° C. At the end of 15 minutes the olefinic nonsaturation had disappeared. The solution was then diluted with 500 g. of water (28 mols) and hydrogenated in an autoclave at 140° C. under 20 atm. of hydrogen in the presence of 12.5 g. of Raney nickel. Adsorption of hydrogen ceased at the end of about an hour and a half. The catalyst was filtered, acidity neutralized by passage over an ion exchange resin and the solvents evaporated under reduced pressure. The residue consisted of practically pure colorless and odorless 1,2,6-hexanetriol containing as principal impurities approximately 0.1% hexanedial isomers. There were 290 g. obtained, i.e., nearly 98% of the theoretically quantity.

EXAMPLE 2

This test was performed under the same conditions as the previous one, but the isopropanol was replaced by one liter of anhydrous ethanol (790 g. or 17 mols). An appreciably equal quantity of 1,2,6-hexanetriol was obtained, 287 g. of the same quality, i.e., an approximately 96% yield.

EXAMPLE 3

There were 250 g. of 2-formyl-3,4-dihydro (2H) pyran dissolved in one liter of methanol (790 g., i.e., approx. 25 mols), the solution then being acidified with 0.1 cc. of 10 N hydrochloric acid. At 20° C. saturation of the olefinic double bonds was carried out in about four hours. The solution was then diluted with 500 g. of water and hydrogenated as in Example 1 and 283 g. of pure 1,2,6-hexanetriol were obtained with a yield of approximately 95%.

EXAMPLE 4

There were 250 g. of 2-formyl-3,4-dihydro (2H) pyran dissolved in 1000 g. of 1,2,6-hexanetriol (7.5 mols) and the solution was acidulated with 0.1 cc. of concentrated sulfuric acid. After 15 minutes at a temperature having ranged from approximately 20 to 45° C., the solution was diluted with 500 g. of water and hydrogenated at 120° C. under 20 atm. of hydrogen in the presence of 15 g. of Raney nickel for two and a half hours. After treatment of the reaction mixture, as in Example 1, 1,285 g. of 1,2,6-hexanetriol were collected, which corresponds to a yield of approximately 95.5%.

We claim:

1. A process for the preparation of 1,2,6-hexanetriol from the dimer of acrolein (2-formyl-3,4-dihydro (2H) pyran) which comprises:
   (a) dissolving the acrolein dimer in an excess of an alcohol selected from the group consisting of saturated aliphatic, linear, ramified and cyclic alcohols having from 1 to 8 carbon atoms and in an amount varying from between about 2 to 20 moles of alcohol per mole of acrolein dimer and maintaining the solution at a pH between approximately 2 to 4 and at a temperature between about −10° C. and 80° C. for a sufficient length of time to eliminate the olefinic unsaturation by addition of said alcohol to the double bond to obtain a solution containing alkoxy aldehyde and hemiacetal thereof; and
   (b) in a second stage adding to such solution an amount of water sufficient to substantially hydrolyze the acetal groups present, and carrying out said hydrolysis simultaneously with hydrogenation to produce 1,2,6-hexanetriol, said second stage being carried out at a reaction temperature between about 40° C. and 160° C. under a hydrogen pressure ranging between about atmospheric pressure and 50 atmospheres.

2. The process of claim 1 wherein the hydrogenation catalyst is selected from the group consisting of Raney nickel, Raney cobalt, reduced nickel, reduced cobalt, nickel obtained by decomposition of nickel formate or nickel oxalate, cobalt obtained by decomposition of cobalt formate or cobalt oxalate, copper chromite, palladium, platinum, ruthenium and rhodium, the aforesaid catalysts deposited on a carrier or activated by the presence of a metal promoter selected from the group consisting of chromium, copper and molybdenum.

3. The process of claim 1 wherein the pH of step (b) is between approximately 2 to 4.

4. The process of claim 1 in which hydrolysis and catalytic hydrogenation of the second stage are carried out on the reaction fluid obtained in the first stage upon the end of saturation of the double bonds.

5. The process of claim 1 in which 4 to 30 mols of water per mol of acrolein dimer are used in the second stage.

6. The process of claim 1 in which the catalyst used in the second stage is selected from the group consisting of copper chromite, palladium, platinum, ruthenium and rhodium deposited on an inert carrier.

7. The process of claim 1 in which the quantity of catalyst to be used in the second stage ranges between 0.1 and 30% by weight related to the dimer weight.

References Cited

UNITED STATES PATENTS

| | | | |
|---|---|---|---|
| 2,097,493 | 11/1937 | Leuck et al. | 260—635 E |
| 2,639,297 | 5/1953 | Whetstone et al. | 260—635 E |
| 2,704,771 | 3/1955 | Smith | 260—615 R |
| 3,168,579 | 2/1965 | Boswell et al. | 260—375 A |

FOREIGN PATENTS

| | | | |
|---|---|---|---|
| 1,139,997 | 1/1969 | Great Britain | 260—635 E |
| 1,559,112 | 1/1969 | France | 260—635 E |

OTHER REFERENCES

Hall: "J. Chem. Soc." (1953), pp. 1398–1402.

Wood et al.: "J. Am. Chem. Soc.," vol. 69 (1947), p. 69.

LEON ZITVER, Primary Examiner

J. E. EVANS, Assistant Examiner

U.S. Cl. X.R.

260—635 E, 345.9